US006349622B1

(12) United States Patent
Lemaire et al.

(10) Patent No.: US 6,349,622 B1
(45) Date of Patent: Feb. 26, 2002

(54) MULTI PURPOSE VALVE OPENING TOOL

(76) Inventors: Stephan Lemaire, 1453 des Oblats, Chambly, Quebec; Patrick Mellot, 958 des Jordy, Terrebonne, Quebec, both of (CA)

( * ) Notice: Subject to any disclaimer, the term of this patent is extended or adjusted under 35 U.S.C. 154(b) by 0 days.

(21) Appl. No.: 09/727,899

(22) Filed: Dec. 1, 2000

(30) Foreign Application Priority Data

Dec. 3, 1999 (CA) .............................................. 2291569

(51) Int. Cl.⁷ .............................................. B25B 13/00

(52) U.S. Cl. .................... 81/124.4; 81/176.15; 251/291; 74/552; 74/557

(58) Field of Search ............................. 81/124.4, 176.1, 81/176.15; 251/291, 292; 74/557, 552

(56) References Cited

U.S. PATENT DOCUMENTS

| | | | | | |
|---|---|---|---|---|---|
| 2,344,045 | A | * | 3/1944 | Kochenderfer | ................ 74/552 |
| 2,682,042 | A | * | 6/1954 | Harcum | ................... 74/552 X |
| 2,851,901 | A | * | 9/1958 | Kortier et al. | ................. 74/557 |
| 2,881,638 | A | * | 4/1959 | Taylor | ....................... 74/557 X |
| 3,046,811 | A | * | 7/1962 | Seubert | ....................... 74/557 |
| 3,196,708 | A | * | 7/1965 | Weitzman | .................... 74/552 |
| 4,817,663 | A | * | 4/1989 | McAndrew | ................ 251/292 |
| 4,991,469 | A | * | 2/1991 | Bella | .................... 81/176.15 X |

* cited by examiner

*Primary Examiner*—Kevin Shaver
*Assistant Examiner*—John Bastianelli
(74) *Attorney, Agent, or Firm*—Eric Fincham

(57) ABSTRACT

A multipurpose tool suitable for opening a number of different valve structures such as commonly found in public service domains such as fire hydrants, natural gas, fire trucks, etc. The tool is compact and is designed to grip a number of different size valve stems.

7 Claims, 4 Drawing Sheets

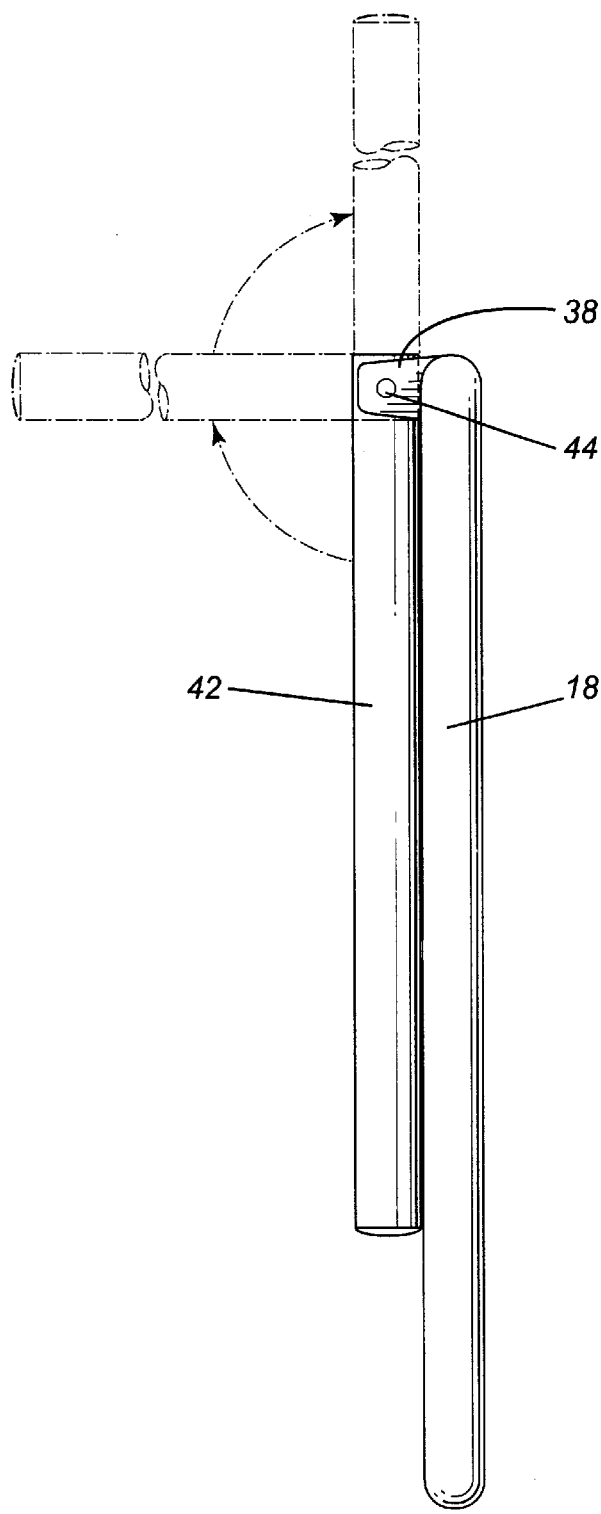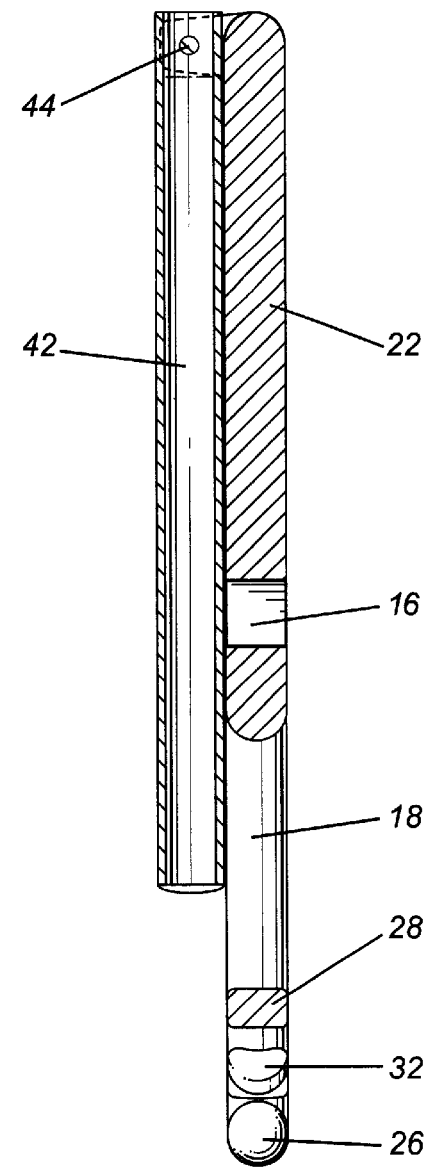
*Fig. 4*     *Fig. 5*

MULTI PURPOSE VALVE OPENING TOOL

FIELD OF THE INVENTION

The present invention relates to a multi purpose tool suitable for opening valves.

BACKGROUND OF THE INVENTION

There are many multipurpose tools known in the art, each generally adapted for a different purpose. For example, there are many multi purpose tools known in the carpentry field. However, in the known tools for opening valve structures, there are no known commercially available multi purpose tools which are designed to be portable and readily adaptable for such purposes. Such a tool would be useful for a service workers employed in the public sector such as firemen, natural gas workers, public works workers and the like. Generally, these people must carry a plurality of different tools each one designed to open and close a particular valve structure. As such, this becomes inconvenient and is also a greater expense for the municipality or other organization.

Also, such a multi purpose tool could be useful in an emergency situation where the worker concerned would not normally have a tool for a particular valve structure.

SUMMARY OF THE INVENTION

It is therefore an object of the present invention to provide a multi purpose tool which is adaptable for use with a number of different valve structures.

As is known in the art, a number of valve structures do not have a handle or other ready means of opening the valve structure, particularly when such valves are accessible by the public. To do otherwise would open up the potential for mischief and potentially dangerous situations such as when natural gas or other flammable products are concerned.

According to one aspect of the present invention, there is provided a multi purpose tool which comprises an outer ring terminating at first and second spaced apart ends, a hub, and a plurality of spokes radiating outwardly from t he hub to said outer ring, an inwardly extending recess formed in the outer ring, the inwardly extending recess being defined by an inwardly extending concave connecting member extending between the first and second spaced apart ring ends, the inwardly concave portion having an outwardly extending protrusion formed thereon, and the outer ring having handle connection means thereon.

The multi purpose tool of the present invention preferably has a handle to provide additional leverage. In the interest of providing maximum flexibility and for storage purposes, the handle is preferably suitably connected to the outer ring and thus can be moved from a first compact storage position wherein it lies against the tool to a second position wherein it is substantially vertical to the ring to a third position wherein it extends outwardly of the ring to provide maximum leverage.

The multipurpose tool may have a number of different apertures sized to receive different valve stems. Preferably, there would be at least three such apertures along with a further opening means defined by the concave connecting member and the outwardly extending protrusion.

The tool may be formed by conventional means of manufacture and is preferably formed of a metallic material.

The valve stems for which the tool is designed to open may vary, but given such a tool suitable for public sector workers, one embodiment provides an arrangement wherein the center aperture is designed to fit the valve stem of fire hydrants while the opening means defined by the inwardly concave connecting member and the protrusion may be utilized to open gas valves and those provided on fire trucks.

BRIEF DESCRIPTION OF THE DRAWINGS

Having thus generally described the invention, reference will be made to the accompany drawings illustrating an embodiment thereof, in which:

FIG. 4 is a side elevational view as seen from the right hand side of FIG. 2 showing movement of the handle;

FIG. 5 is a sectional view taken along the lines 5—5 of FIG. 2; and

DESCRIPTION OF PREFERRED EMBODIMENTS

Figure 1:
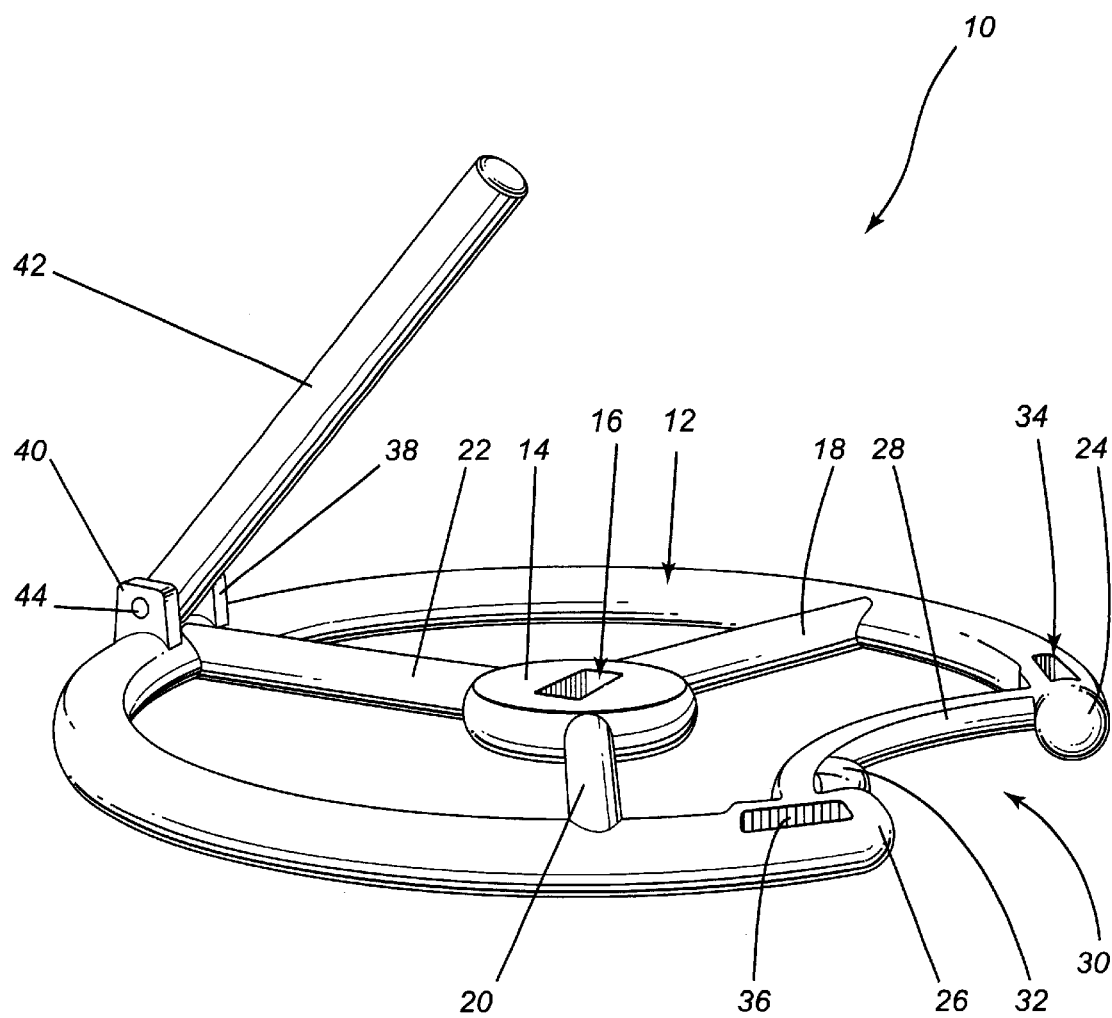
FIG. 1 is a perspective view of a multi purpose tool according to an embodiment of the present invention.

Referring to the drawings in greater detail and by reference characters thereto there is illustrated in FIG. 1 a multi purpose tool according to an embodiment of the present invention and which is generally designated by reference numeral 10.

Multi purpose tool 10 has an outer ring 12 interiorly of which is a center hub 14. Center hub 14 includes a generally rectangular aperture 16 sized to receive a valve stem.

Interconnecting center hub 14 and outer ring 12 are spokes 18, 20 and 22.

Figure 2:
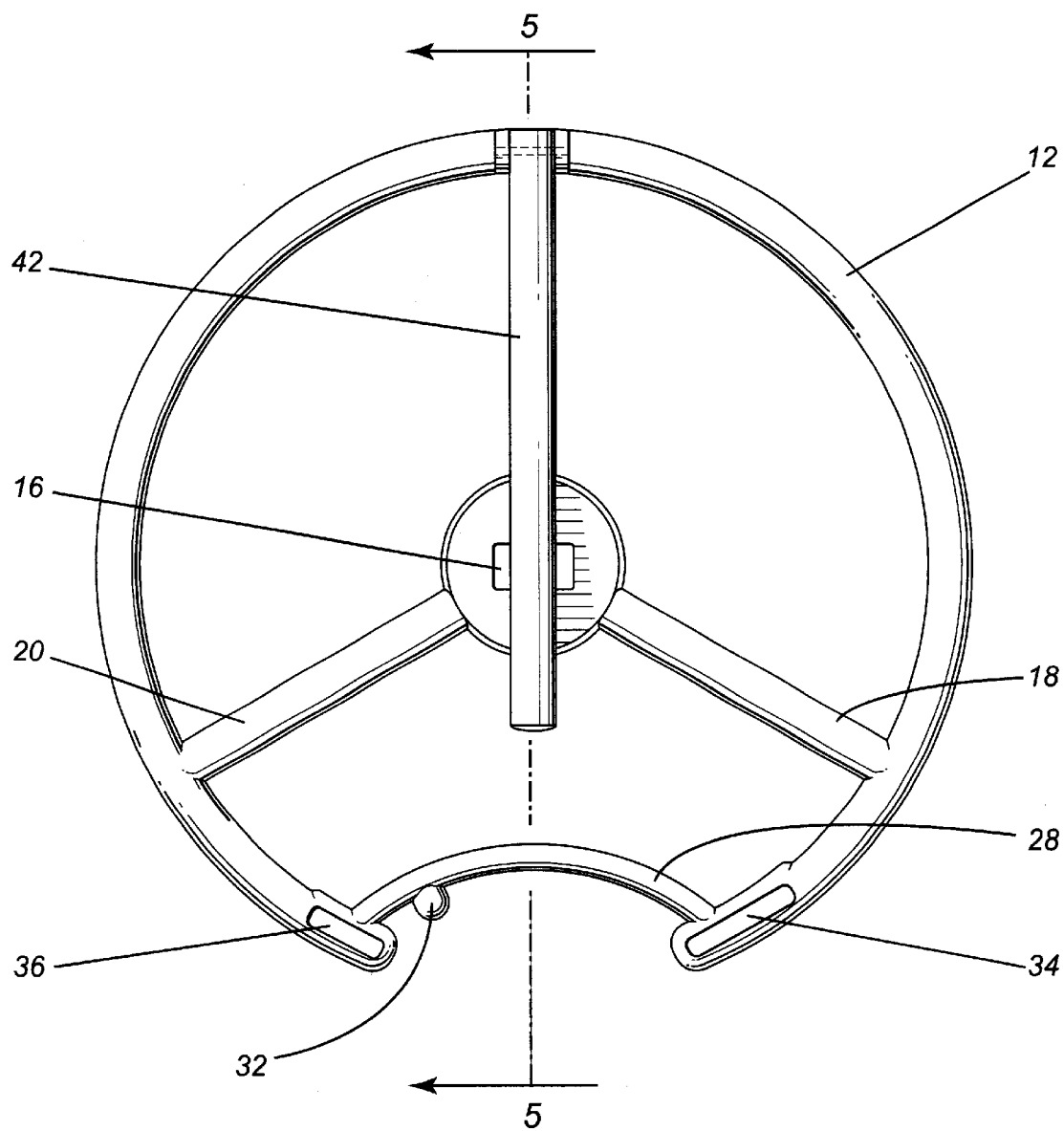
FIG. 2 is a top plan view thereof with the handle being in a storage position.
Figure 3:
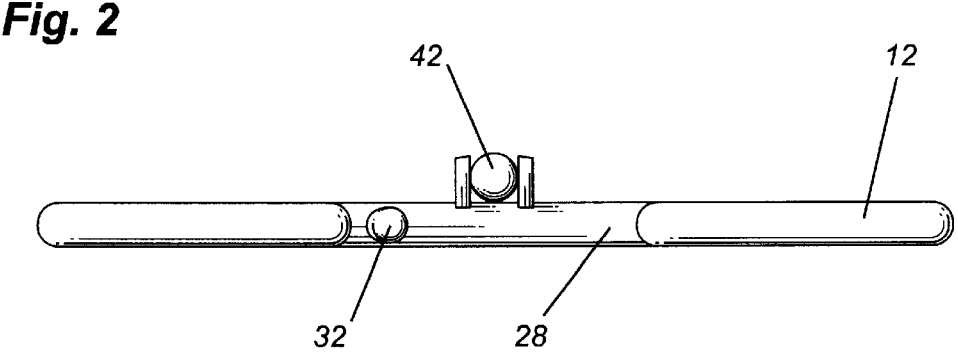
FIG. 3 is a side elevational view thereof as seen from the bottom of FIG. 2.

As may be seen in FIGS. 1 and 2, outer ring 12 is not of a complete circular outline, but rather terminates at a first end 24 and a second end 26. Extending inwardly from a position adjacent first end 24 and second end 26 is a concave connecting member 28.

Concave connecting member 28 thus defines an inwardly extending recess generally designated by reference numeral 30. Mounted on concave connecting member 28 and extending outwardly therefrom is a protrusion 32 and which is mounted proximate second end 26.

Formed in outer ring 12 is a first rectangular recess 34 and a second rectangular recess 36, each recess being sized to receive a different size valve stem.

Extending upwardly from outer ring 12, in a position diametrically opposed to concave connecting member 28, are a first ear 38 and a second ear 40. Mounted between first ear 38 and second ear 40 is a handle 42 and which is retained by means of a pin 44.

Figure 6A:
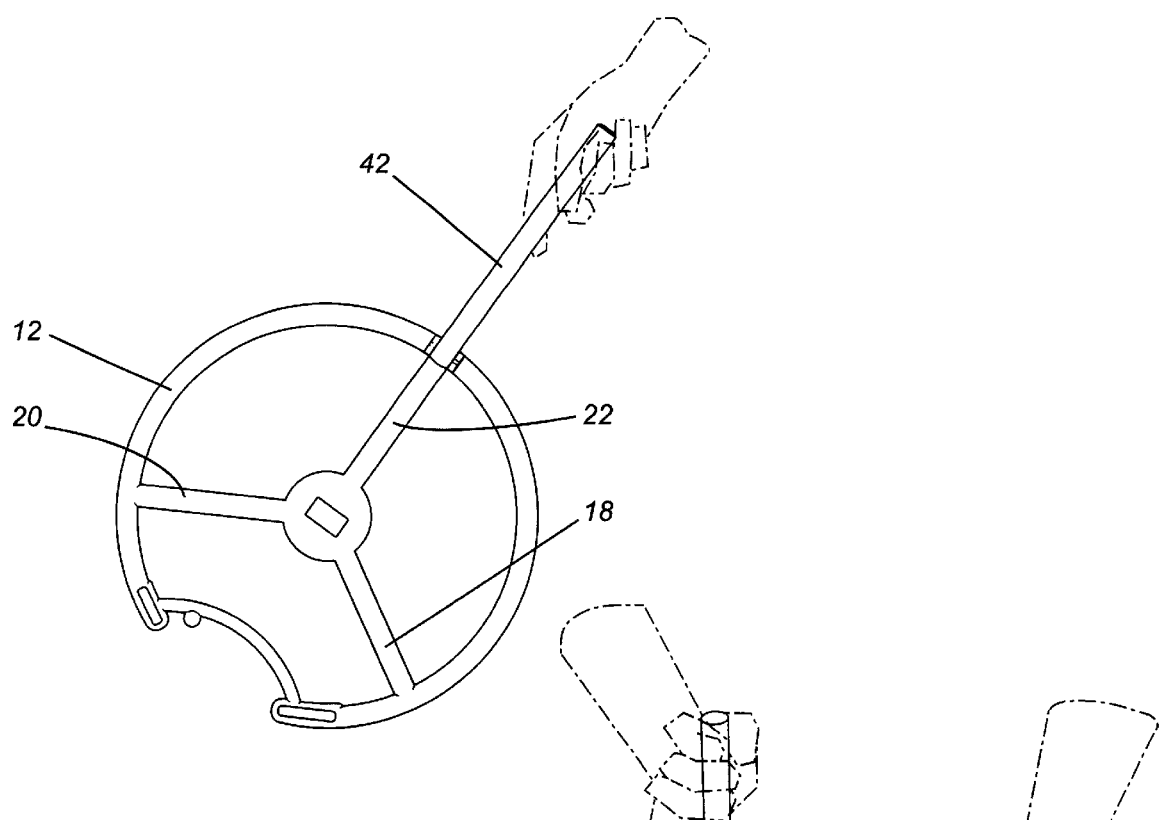
FIGS. 6a, 6b, and 6c illustrate the use and operation of the multi purpose tool according to the present invention.
Figure 6B:
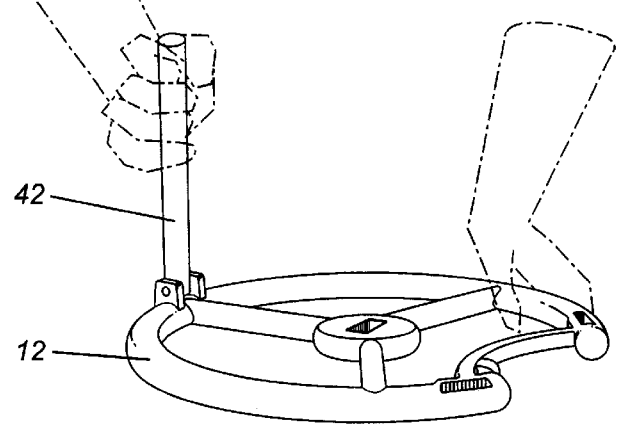
Figure 6C:
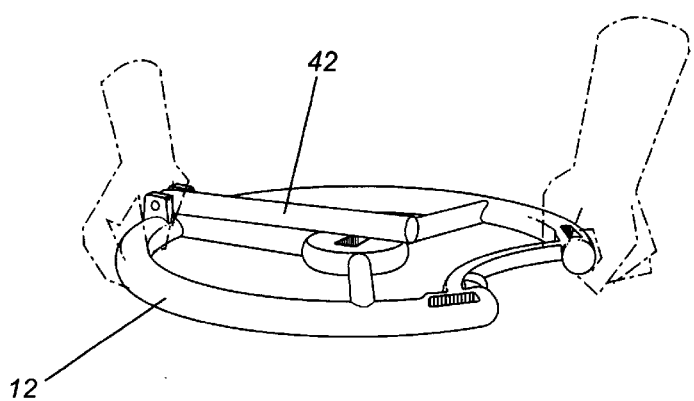

In use, and as may be seen in FIGS. 6a, 6b and 6c, the multi purpose tool may be used in many different manners. Thus, for maximum leverage, handle 42 may be extended outwardly. In other instances, and particularly where space is restricted, handle 42 may extend perpendicularly upwardly from outer ring 12. Alternatively, outer ring 12 may be gripped by the hands of the user for turning of the same.

The concave connecting member 28, in conjunction with protrusion 32, is useful in connecting gripping convention natural gas valves and those on vehicles such a fire trucks.

Thus, the valve may be opened with first ends 24 and 26 gripping the valve and protrusion 32 providing a grip thereon.

It will be understood that the above described embodiments are for purposes of illustration only and that changes and modifications may be made thereto without departing from the spirit and scope of the invention.

We claim:

1. A multi purpose tool comprising:

an outer ring terminating at first and second spaced apart ends, a hub, and a plurality of spokes radiating outwardly from said hub to said outer ring;

an inwardly extending recess formed in said outer ring, said inwardly extending recess being defined by an inwardly extending concave connecting member extending between said first and second spaced apart ring ends, said inwardly concave portion having an outwardly extending protrusion formed thereon; and said outer ring having handle connection means thereon.

2. The multi purpose tool of claim 1 further including a handle connected to said handle connection means, said handle being moveable between a first position perpendicular to said ring to a second position substantially parallel to said outer ring.

3. The multi purpose tool of claim 2 wherein said hub includes a substantially rectangular hub aperture formed therein, said hub aperture being configured to receive a valve stem.

4. The multi purpose ring of claim 2 wherein said outer ring includes at least one aperture formed therein, said aperture being configured to receive a valve stem.

5. The multi purpose tool of claim 2 wherein there are provided a plurality of apertures formed in said outer ring, each one of said apertures being configured and sized to receive a different size of valve stem.

6. The multi purpose tool of claim 2 wherein said outer ring includes first and second apertures formed therein, each one of said apertures being located proximate a respective first and second end of said outer ring.

7. The multi purpose tool of claim 2 wherein said tool is formed of a metallic material.

* * * * *